(12) United States Patent
Anand et al.

(10) Patent No.: US 11,710,088 B1
(45) Date of Patent: Jul. 25, 2023

(54) SCALABLE ORDER MANAGEMENT MONITORING

(71) Applicant: Target Brands, Inc., Minneapolis, MN (US)

(72) Inventors: Anup Anand, Karnataka (IN); Chandrashekhar Naik, Karnataka (IN); Dheeraj Singhal, Karnataka (IN); Harikrishnan Aravindakshan, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 39 days.

(21) Appl. No.: 17/176,347

(22) Filed: Feb. 16, 2021

(51) Int. Cl.
*G06Q 10/06* (2023.01)
*G06Q 10/0631* (2023.01)

(52) U.S. Cl.
CPC .................. *G06Q 10/06316* (2013.01)

(58) Field of Classification Search
CPC ....................................................... G06Q 10/06
See application file for complete search history.

(56) References Cited

U.S. PATENT DOCUMENTS

| | | | |
|---|---|---|---|
| 6,546,364 B1 * | 4/2003 | Smirnov | G06Q 10/0633 703/2 |
| 8,540,153 B2 | 9/2013 | Stone et al. | |
| 8,768,915 B2 | 7/2014 | Gao et al. | |
| 10,142,174 B2 | 11/2018 | Yang et al. | |
| 10,169,757 B1 * | 1/2019 | Vippagunta | G06F 16/43 |
| 10,424,005 B2 | 9/2019 | Corlett et al. | |
| 10,509,921 B2 * | 12/2019 | Kunjachan | H04L 63/101 |
| 10,621,203 B2 | 4/2020 | Hunt et al. | |
| 2007/0087756 A1 * | 4/2007 | Hoffberg | G06Q 20/065 455/450 |
| 2007/0233754 A1 | 10/2007 | Baeuerle et al. | |
| 2007/0271152 A1 * | 11/2007 | Vo | G06Q 30/0601 705/26.1 |
| 2008/0294644 A1 * | 11/2008 | Liu | G06F 40/30 |
| 2009/0164833 A1 | 6/2009 | Sebastian | |

(Continued)

FOREIGN PATENT DOCUMENTS

| | | | | |
|---|---|---|---|---|
| WO | WO-0175746 A2 * | 10/2001 | .......... | G06Q 10/087 |
| WO | WO-2021038437 A1 * | 3/2021 | .......... | B65G 1/0464 |

OTHER PUBLICATIONS

Marcello La Rosa, Stephan Clemens and Arthur ter Hofstede, The Order Fulfillment Process Model, Sep. 30, 2009. Version: 1.1 (Year: 2009).*

(Continued)

*Primary Examiner* — Kurtis Gills
(74) *Attorney, Agent, or Firm* — Merchant & Gould P.C.

(57) ABSTRACT

Scalable order event monitoring and handling is provided. A fulfillment process of an order may be represented by a plurality of events corresponding to state or status changes of items included in the order. Consistent hashing is used to track order events to associate events that are tied to a same order to each other and to ensure associated events are distributed to a same general computing device/cluster for tracking purposes, while allowing parallel storage of order events across multiple separate data stores. Additionally, the order process may be represented as a weighted directed graph, which can help track missing events and order transitions efficiently.

20 Claims, 6 Drawing Sheets

(56) References Cited

U.S. PATENT DOCUMENTS

2011/0218813 A1* 9/2011 Addala ................. G06F 16/00
707/758
2018/0174226 A1* 6/2018 Yoon ................. G06Q 30/0635
2019/0042353 A1 2/2019 Ahad
2021/0082001 A1* 3/2021 Yolken ............... G06Q 30/0277

OTHER PUBLICATIONS

Sterling Order Management—Error Handling during the order creation process; https://www.ibm.com/knowledgecenter; Sep. 3, 2020; 4 Pages.
IBM Sterling Order Management—IBM Sterling Solution Brief—Deliver on more customer promises; 2020; 6 Pages.

* cited by examiner

SCALABLE ORDER MANAGEMENT MONITORING

TECHNICAL FIELD

The present disclosure relates generally to a scalable tool for management of orders.

BACKGROUND

Order management platforms are oftentimes used by enterprises to manage orders. An order management platform may comprise a command orchestrator, as well as various services that operate to provide order management functionality. One example service is a monitoring service that may be used to generate and store events associated with orders. For example, the order management platform may be an event-driven system, where events are generated when order state changes occur. Some enterprises that use order management platforms include large retail enterprises that can have large numbers of orders, particularly at peak periods. For example, currently, during particular seasonal periods, a large retail enterprise may generate 250,000 orders per hour or more, which can produce approximately 3-4 million events per hour. Moreover, each event may be stored with state information and item quantity information. As can be appreciated, with such large volumes of events being generated and stored, tracking each order at an item-quantity level can be complex and challenging. When errors occur, such as when an event goes missing, the event-driven order management platform may not be able to track orders accurately at a quantity level, resulting in an inconsistent system.

Traditionally, order events may be stored in a centralized data store, where batch processing may be performed. This traditional approach is not only slow, but also does not scale. For example, batch jobs can cause contention and scalability issues as they only allow one instance to process the data at a time to ensure data consistency.

SUMMARY

In summary, the present disclosure relates to methods, systems, and a computer readable storage device for providing scalable order event monitoring and handling by utilizing consistent hashing to track order events to associate events that are tied to a same order to each other and to ensure associated events are distributed to a same general computing device/cluster for tracking purposes, while allowing parallel storage of order events across multiple separate data stores. Additionally, the order process may be represented as a weighted directed graph, which can help track missing events and order transitions efficiently. Various aspects are described in this disclosure, which include, but are not limited to, the following aspects.

In one aspect, a system for providing scalable order event monitoring and handling includes a data store comprising a plurality of distributed event storage instances; a plurality of scheduler instances; a computing system that includes at least one processor and a memory communicatively coupled to the at least one processor such that when instructions stored on the memory are executed by the at least one processor, operate to: receive a message regarding a change of state of an order; generate a weighted directed graph as a representation of an order process, the weighted directed graph including a first order event corresponding to the change of state; use consistent hashing to assign a sequence number to the first order event, wherein the sequence number is assigned to a scheduler instance of the plurality of scheduler instances; store the first order event in an event storage instance included in the data store based on the sequence number; receive state change information related to the order; record the state change information by generating a second order event for inclusion in the weighted directed graph; use consistent hashing to assign the sequence number to the second order event; and store the second order event in the event storage instance.

In another aspect, a method of providing scalable order event monitoring and handling comprises: receiving a message regarding a change of state of an order; generating a weighted directed graph as a representation of an order process, the weighted directed graph including a first order event corresponding to the change of state; generating a sequence number using consistent hashing; assigning the sequence number to the first order event, wherein the sequence number is assigned to a scheduler instance of a plurality of distributed scheduler instances; storing the first order event in an event storage instance of a plurality of distributed event storage instances based on the sequence number; receiving state change information related to the order; recording the state change information by generating a second order event for inclusion in the weighted directed graph; using consistent hashing to assign the sequence number to the second order event; and storing the second order event in the event storage instance.

In another aspect, a computer-readable storage device comprises computer-executable instructions which, when executed by a computing system, cause the computing system to perform a method of providing scalable order event monitoring and handling, the method comprising receiving a message regarding a change of state of an order; generating a weighted directed graph as a representation of an order process, the weighted directed graph including a first order event corresponding to the change of state; generating a sequence number using consistent hashing; assigning the sequence number to the first order event, wherein the sequence number is assigned to a scheduler instance of a plurality of distributed scheduler instances; storing the first order event in an event storage instance of a plurality of distributed event storage instances based on the sequence number; receiving state change information related to the order; recording the state change information by generating a second order event for inclusion in the weighted directed graph; using consistent hashing to assign the sequence number to the second order event; and storing the second order event in the event storage instance.

DETAILED DESCRIPTION

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure relates to a system and method for providing scalable order event monitoring and handling. More specifically, the present disclosure relates to a system and method for providing scalable order event monitoring and handling. The present disclosure provides accurate tracking of millions of events pertaining to orders at each order's quantity level, in a scalable and flexible system that can be responsive to a high volume of order lookup requests.

Figure 1:
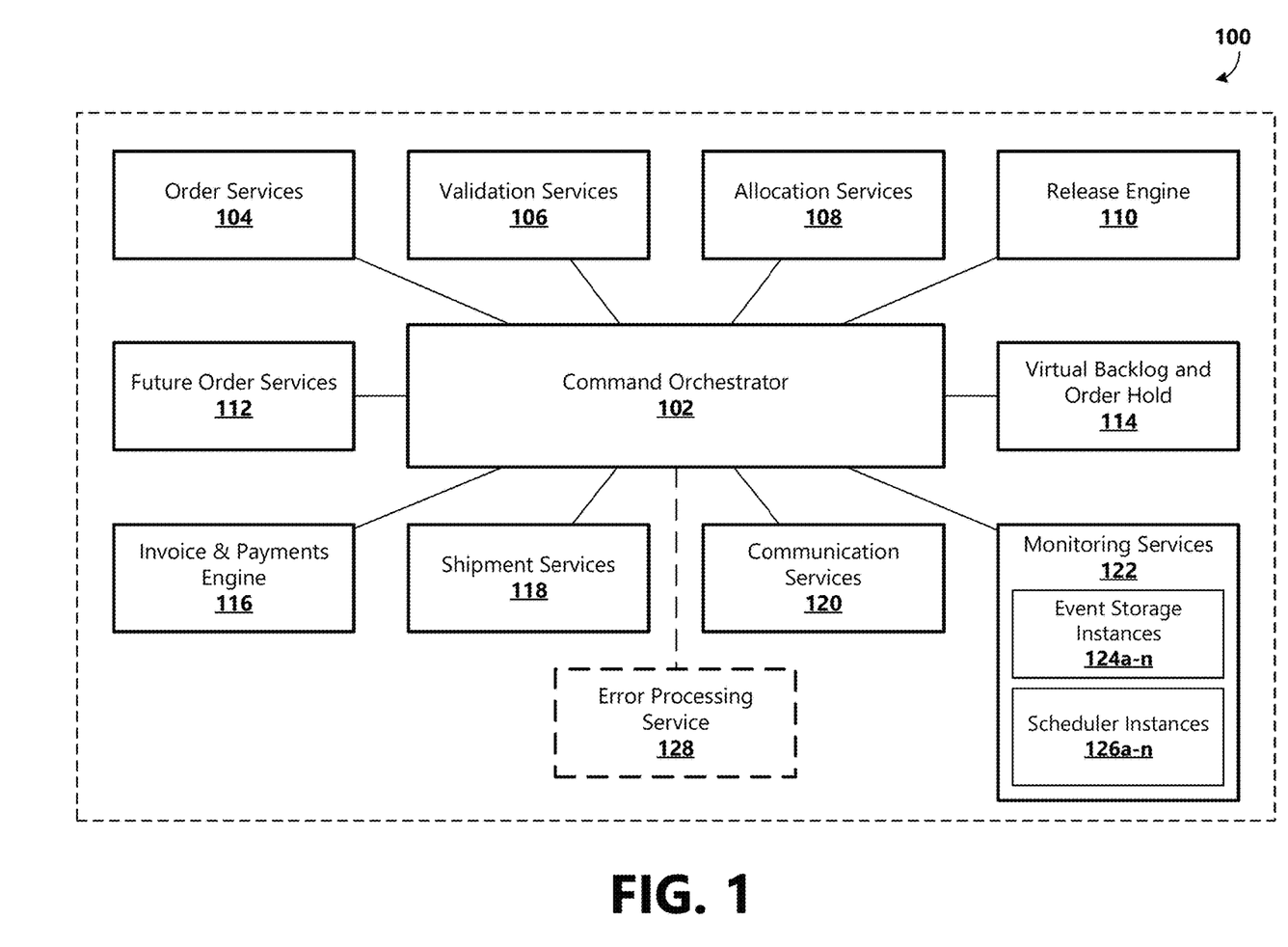
FIG. 1 is a block diagram of an example order management platform according to an embodiment.

FIG. 1 is a block diagram of an example order management platform 100, such as one that may be used by a retail enterprise to manage orders. For example, an order may be a record that details merchandise and/or services to be rendered. The order management platform 100 may comprise a command orchestrator 102 and a plurality of services that operate to perform processes involved in providing order management functions as part of fulfilling an order. For example, the order management platform 100 may be configured as an event-driven system, wherein the command orchestrator 102 may operate to support a publish/subscribe (pub/sub) model for service interactions between the plurality of services. Each of the plurality of services may be implemented as one or more separate computing systems 600 (FIG. 6), software applications, program modules, or the like. The plurality of services in the example order management platform 100 include validation services 106, allocation services 108, a release engine 110, future order services 112, a virtual backlog and order hold 114, an invoice and payments engine 116, shipment services 118, communication services 120, and monitoring services 122. In other examples, additional and/or alternative services may be included.

According to an aspect, the monitoring services 122 are operative or configured to track state change information and quantity information of an order through the order fulfillment process, and may be further operative or configured to apply pre-defined rules to check eligibility of an action and schedule it. When executed by a processing device, the monitoring services 122 operate to perform at least some of the functions described in FIGS. 3, 4, and 5. As mentioned above, the order management platform 100 may be configured as an event-driven system, and the monitoring services 122 may be used to generate and store order events in association with state changes of an order. Example states of an order may include, but are not limited to, a created state, a pre-scheduled state, a scheduled state, a backordered state, a released state, and a shipped and invoiced state. The monitoring services 122 are configured to accurately track millions of events pertaining to orders at the quantity-level, and are configured to process the millions of order events quickly to enable timely actions based on monitored states of the orders. For example, currently, during particular seasonal periods, a large retail enterprise may generate approximately 250,000 orders per hour, and a single line item of each order may go through various state changes as the order is being fulfilled. Accordingly, at times, approximately 3-4 million order events an hour may be generated. Traditionally, order events may be stored in a centralized data store. However, to reduce the load on a centralized database server and additionally improve performance and scalability, the monitoring services 122 utilize parallel storage of order events across distributed event storage instances 124*a-n* (generally 124) comprised of multiple separate databases (or alternatively, separate discrete portions of the same database, e.g., shards of a particular database) and utilize a plurality of scheduler instances 126*a-n* (generally 126) to schedule and process order events. According to an aspect, the scheduler instances 126 may be configured to apply a set of predefined rules to determine eligibility of an action, and when eligible to schedule the action. In some instances, separate scheduler instances 126*a-n* may be used for scheduling and execution of particular actions.

According to an aspect, consistent hashing is used to generate sequence numbers, wherein events associated with a particular order may be associated with a particular sequence number. The sequence numbers enable events associated with a same order to be stored together in a same event storage instance 124 and to be assigned to a particular scheduler instance 126 for processing. A scheduler instance 126 may use service discovery to register itself and to be assigned a sequence number or a range of sequence numbers. The scheduler instance 126 may be allowed to only process order events that match its assigned sequence number(s). Utilization of consistent hashing to generate the sequence numbers allows for even distribution of orders and order events across the plurality of scheduler instances 126, thereby improving performance of the monitoring services 122 by increasing parallelism. For example, using a traditional centralized database, an order management system may not be scalable or fast enough to perform high-speed high-volume lookup requests. For example, contention and scalability issues may arise using a traditional centralized database, where deployment of batch jobs to process data may require that only one scheduler instance may be able to fetch data at a time. Implementing a partitioning strategy to scale data processing enables parallel data processing and helps jobs to scale horizontally based on use case. That is, scheduler instances 126 can be scaled independently on a case-by-case basis, wherein processing delays of a particular type can be reduced or eliminated by adding additional scheduler instances 126.

In some examples, an error processing service 128 may be included that is designed to handle various types of failures within the order management platform 100 and avoid requiring manual recovery from those errors. Generally, the error processing service 128 may consume errors from an incoming stream of error events. The error events may be processed and stored in a distributed database, and subsequently partitioned out to various error handlers, managed by a scheduler. Example errors that may be handled include database issues, SFM API call failures, demand update API call failures, item or location API call failures, get order details call failures, and streaming data call failures. The architecture of the service 128 may be scalable, and new actions or behaviors may be added by introducing additional properties and handlers, with the properties being used to route the error to the appropriate handler by the scheduler.

Figure 2:
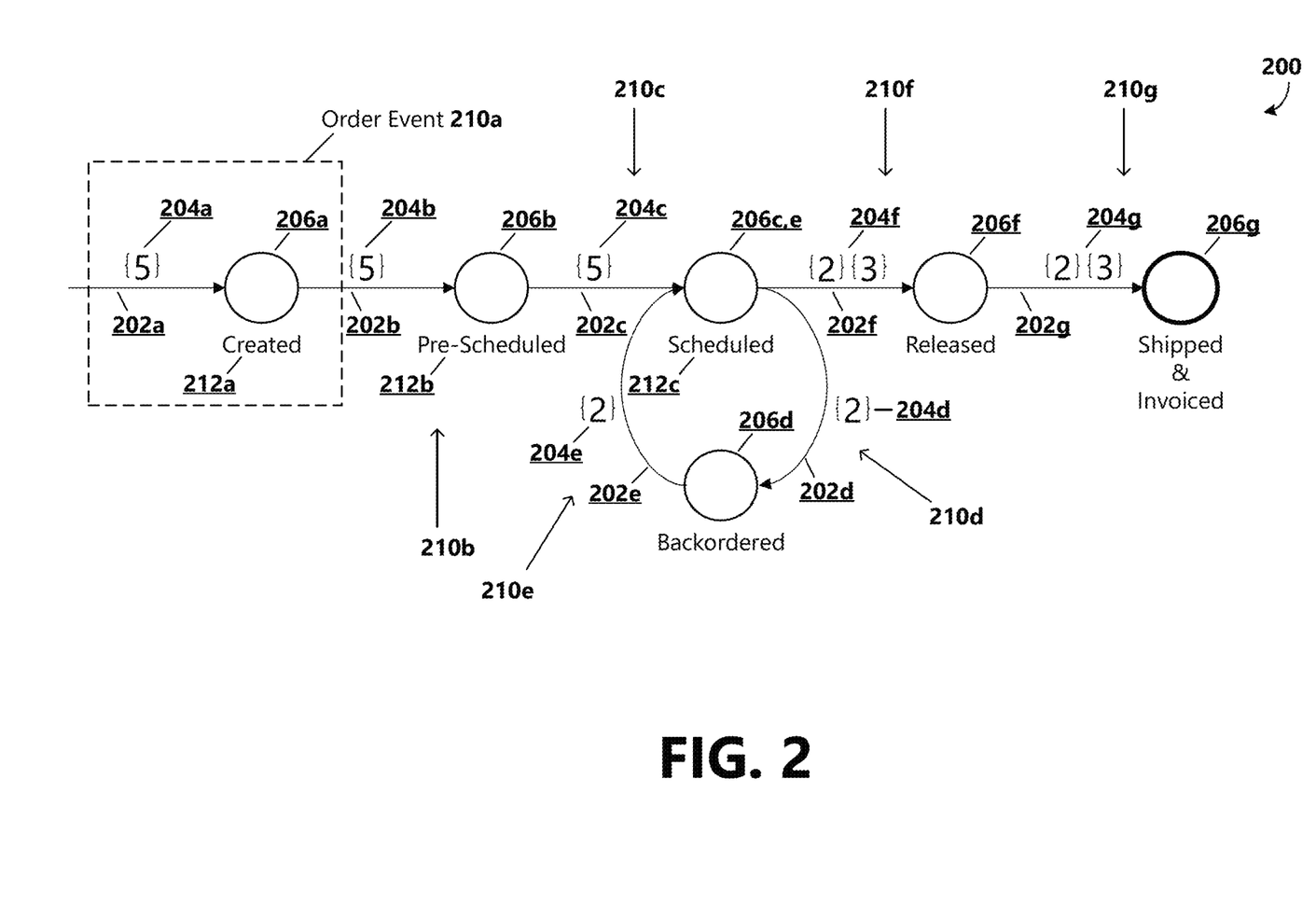
FIG. 2 is an illustration of an order process represented by a plurality of events grouped in a weighted directed graph.

FIG. 2 is an illustration of an example order represented as a weighted directed graph 200. According to an aspect, a fulfillment process of an order may be represented by a plurality of events corresponding to state or status changes of items included in the order. For example, a weighted directed graph 200 may be generated for each line item in an order, wherein each line item may correspond with an item or service (herein referred to as item) to be rendered. Each state change that occurs in association with the line item as part of the order process may be recorded by the monitoring systems 122. For example, each state change may be communicated to the command orchestrator 102 in messages published by the plurality of services in the example order management platform 100, and the command orchestrator 102 may be configured to communicate the state changes to subscribing services, such as the monitoring services 122. Each change in state of an order item during the order process is represented as an order event 210a-n (generally 210) comprising an edge 202a-n (generally 202) connecting to a node 206a-n (generally 206), wherein the edge 202 has an associated weight 204a corresponding to item quantity information and the node 206 that the edge 202 is directed to includes state information 212a-n (generally 212) corresponding to the change in state of the order item. According to an aspect, all order events 210 associated with an order may be grouped by a same weighted directed graph 200, which enables efficient complex data lookups and helps to track missing order events 210 in an order process. As can be appreciated, a weighted directed graph 200 additionally assists with efficiently tracking transitions of an order through the order process, as well as grouping of order events at a common storage location despite distributed processing and storage of such order events across a number of data stores.

For example and with reference to the example weighted directed graph 200 illustrated in FIG. 2, a first order event 210a may be recorded for a creation of an order that includes a quantity of 5 items to be rendered. The first order event 210a may include a first node 206a corresponding to a change in state of the order item to a created state, wherein the first node 206a includes state information 212a that indicates the state associated with the state change. The first order event 210a may further include a first edge 202a directed to the first node 206a that includes a weight 204a corresponding to the item quantity (5).

A second order event 210b included in the example weighted directed graph 200 may represent a change in state of the 5 items to a pre-scheduled state, as indicated by a second edge 202b including a weight 204b of 5 directed to a second node 206b including state information 212b indicating the pre-scheduled state.

A third order event 210c included in the example weighted directed graph 200 may represent a change in state of the 5 items to a scheduled state, as indicated by a third edge 202c including a weight 204c of 5 directed to a third node 206c including state information 212c indicating the scheduled state.

A fourth order event 210d included in the example weighted directed graph 200 may represent a change in state of 2 of the 5 items to a backordered state, as indicated by a fourth edge 202d including a weight 204d of 2 directed at a fourth node 206d including state information 212d indicating the backordered state.

A fifth order event 210e included in the example weighted directed graph 200 may represent a change in state of the 2 backordered items to the scheduled state, as indicated by a fifth edge 202e including a weight 204e of 2 directed at a fifth node 206e including state information 212e indicating the scheduled state. In this example, the third node 206c and the fifth node 206e are a same node. As illustrated, the example weighted directed graph 200 provides a clear indication of the backorder and re-scheduling events (i.e., fourth order event 210d and fifth order event 210e) of 2 of the 5 items included in the order.

A sixth order event 210f included in the example weighted directed graph 200 may represent a change in state of the 2 backordered items and the other 3 items to a released state, as indicated by a sixth edge 202f including a collective weight 204f of 5 directed at a sixth node 206f including state information 212f indicating the released state.

A seventh order event 210f included in the example weighted directed graph 200 may represent a change in state of the 2 backordered items and the other 3 items to a shipped and invoiced state, as indicated by a seventh edge 202g including a collective weight 204g of 5 directed at a seventh node 206g including state information 212g indicating the shipped and invoiced state. The seventh order event 210f may be a final event in the order process.

Figure 3:
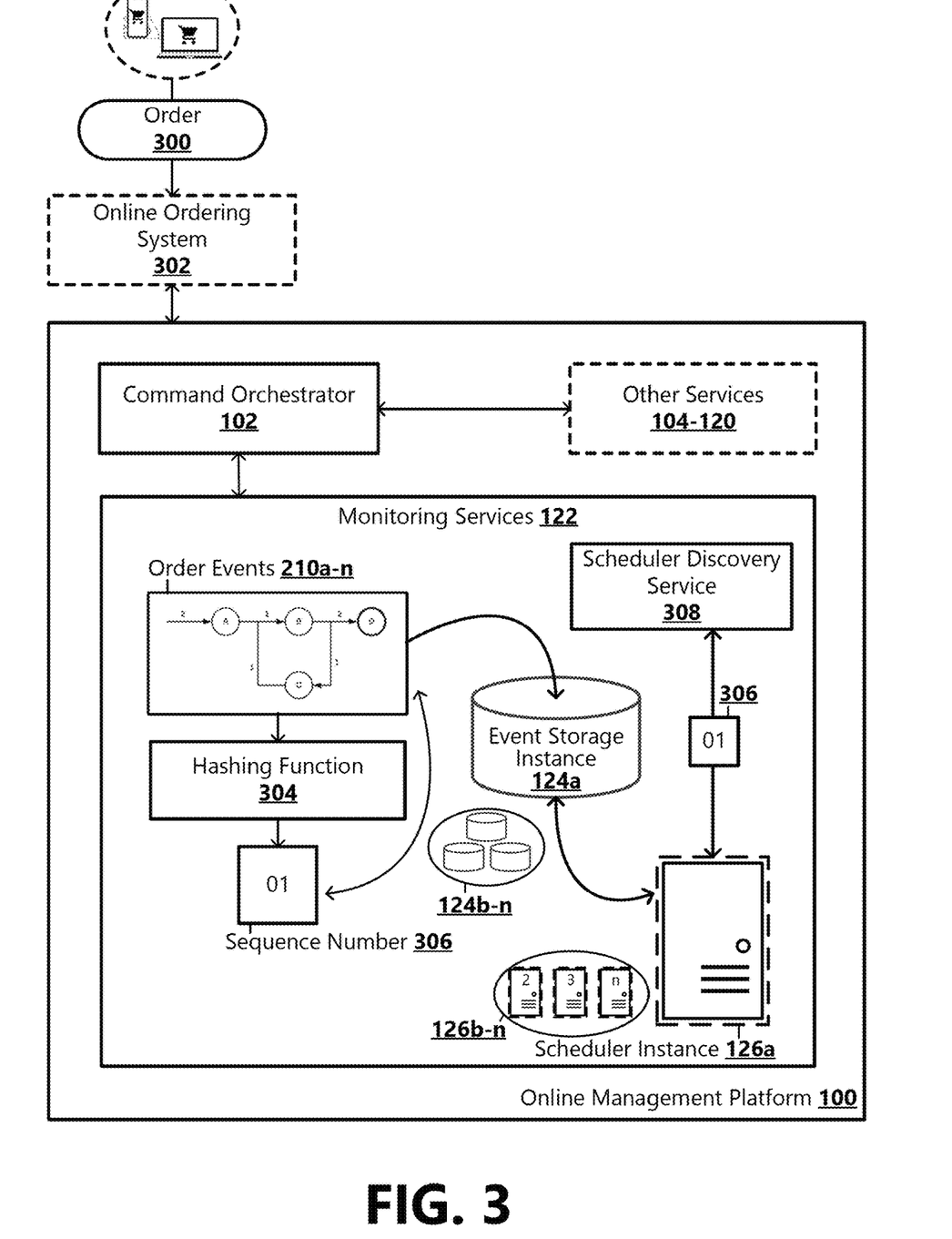
FIG. 3 is a block diagram showing details of example monitoring services and aspects of grouping and processing ordered events.

Having described example order events 210 and aspects of representing an order process as a weighted directed graph 200 comprised of grouped ordered events 210, FIG. 3 is a block diagram illustrating further details of the monitoring services 122 and aspects of grouping and processing ordered events 210. With reference now to FIG. 3, in various examples, the monitoring services 122 may receive an indication of a new order 300 in response to a sale made through an online ordering system 302 in communication with the order management platform 100. For example, the online ordering system 302 may receive the order 300 from a customer, and the plurality of services included in the order management platform 100 may perform various processes to fulfill the order 300. In an example, the monitoring services 122 may subscribe to receive a message or signal from the command orchestrator 102 in association with a change of state of an order 300. As described, various states of an order 300 may include, but are not limited to: a created state, a pre-scheduled state, a scheduled state, a backordered state, a released state, and a shipped and invoiced state. Accordingly, upon receiving a message or signal indicating creation of an order 300, the monitoring services 122 may generate an order event 210 including quantity information and state information 212 as described above.

According to an aspect, all order events 210 associated with a same line item in an order 300 may be grouped by a same weighted directed graph 200, and all order events 210 associated with a same order 300 may be grouped according to an assigned sequence number 308. The sequence number 308 enables order events 210 that are associated with a same order 300 to all be stored in a same event storage instance 124, while allowing for distributed storage of order event 210 data across multiple event storage instances, thereby increasing capacity of the overall system for receipt of order events 210 (and thus, orders 300). Additionally, by using a common sequence number, an order event handling system (e.g., the monitoring services 122) may be performed using a plurality of instances all managed by the command orchestrator 102. Accordingly, such monitoring services 122 may also be parallelized across a number of instances of such services, improving order event processing throughput.

According to an aspect, the monitoring services 122 may utilize a hashing function 304 to generate a sequence number 308 for binding order events 210 associated with a same line item of an order 300 and for further binding order events 210 associated with the same order 300. In some examples, each scheduler instance 126 may be assigned a sequence number 308, and the scheduler instance 126 may be allowed to only process order events 210 that match that sequence number 308. Utilization of the hashing function 304 to generate and assign sequence numbers 308 allows for even distribution of orders 300 and order events 210 across the plurality of scheduler instances 126 (and event storage instances 124*a-n*), thereby improving performance of the monitoring services 122 by increasing parallelism. For example, millions of order events 210 can be distributed and processed in parallel, and the event storage instances 124 and scheduler instances 126 can be independently scaled based on the load on the system.

According to an aspect, a scheduler instance 126 may be configured to apply a set of rules to check eligibility of an action, and if eligible, to schedule the action. The rules may be logic evaluator statements associated with various order fulfillment actions. The logic evaluation can be performed using any type of arithmetic equations. For example, a rule applied by a scheduler instance 126 may evaluate current states of items of an order 300 and, for example, if an order item is in a state that may delay at least a portion of the order 300, the scheduler instance 126 may schedule an associated action, such as to notify the customer. In some instances, a further scheduler instance 126 may then emit an event, which is consumed by one of the plurality of services 104-120 included in the order management platform 100 to execute some action. Thus, if the scheduler instance 126 evaluates the logic of a rule using an order event 210 and determines that an action is appropriate, a message (e.g., the event noted above) may be sent to the command orchestrator 102 to publish the action so that it can be executed by the appropriate service 104-120.

Figure 4:
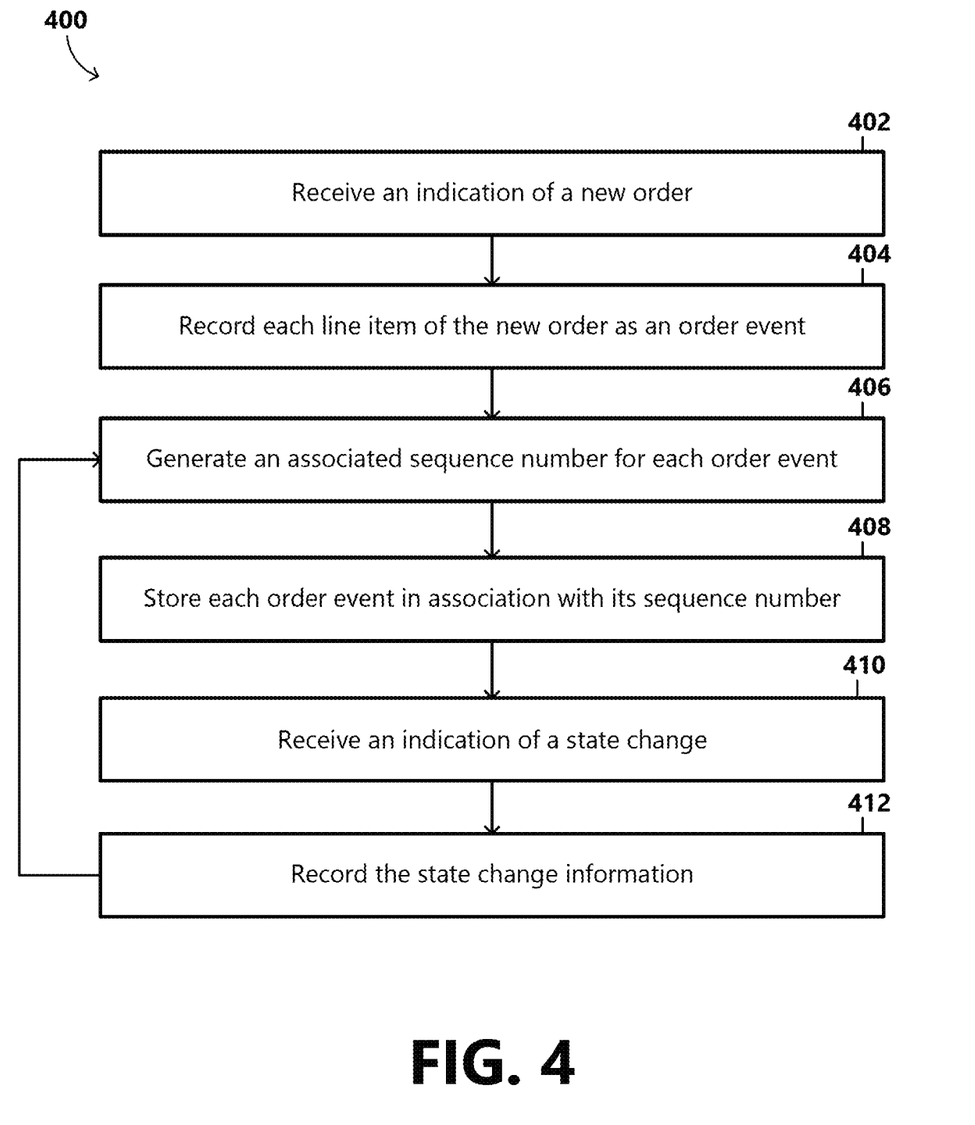
FIG. 4 is a flow chart depicting general stages of an example method for providing scalable order event monitoring and handling.

FIG. 4 is a flow diagram depicting general stages of an example method 400 for providing scalable order event monitoring and handling according to an embodiment. At OPERATION 402, an indication of a new order 300 may be received. For example, responsive to a sale made through an online ordering system 302 in communication with the order management platform 100, the monitoring services 122 may receive an indication of a new order 300. For example, the monitoring services 122 may subscribe to receive a message or signal from the command orchestrator 102 in association with a change of state of an order 300. According to one example, the order services 104 may be configured to publish a message to the command orchestrator 102 in association with the creation of the order 300 (i.e., change of the state of the order 300 to a created state).

At OPERATION 404, each line item included in the order 300 may be recorded as an order event 210, wherein each order event 210 may comprise an edge 202 with an associated weight 204 corresponding to the line item quantity, and the edge 202 is directed to a node 206 including state information 212 corresponding to the created state of the line item. For example, if the order 300 includes a quantity of two (2) of Item A, one (1) order event 210 may be generated in association with the creation of the order 300, the order event 210 comprising an edge 202 with a weight 204 of one (1) directed to a created state node 206. As another example, if the order 300 includes a quantity of two (2) of Item A and a quantity of three (3) of Item B, two (2) order events 210 may be generated in association with the creation of the order 300: a first order event 210 comprising an edge 202 with a weight 204 of two (2) directed to a created state node 206, and a second order event 210 comprising an edge 202 with a weight 204 of three (3) directed to another created state node 206.

At OPERATION 406, a sequence number 308 may be generated for each order event 210. In example aspects, a hashing function 304 may be utilized by the monitoring services 122 to generate the sequence number(s) 308. Using consistent hashing, all order events 210 (of a particular order 300) are associated with a sequence number 308.

At OPERATION 408, each order event 210 may be stored in an event storage instance 124. Event storage instances 124 may be part of a distributed and scalable data store, thereby enabling parallel storage of order events 210 across multiple separate databases, or portions/shards of the same database, to improve scalability and cater to high volume lookup requests. According to an aspect, the sequence numbers 308 may be utilized to ensure order events 210 are stored with other order events 210 that are associated with the same order 300.

At OPERATION 410, an indication of a state change of an order 300 may be received. For example, responsive to a process being performed by one of the plurality of services that operate to provide order management functions as part of fulfilling an order 300, the monitoring services 122 may receive an indication of a state change. For example, the monitoring services 122 may subscribe to receive a message or signal from the command orchestrator 102 in association with a change of state of an order 300.

At OPERATION 412, an order event 210 representing the state change may be created, wherein the order event 210 includes an edge 202 having a weight 204 corresponding to the line item quantity information associated with the state change, the edge 202 directed to a node 206 comprising state information 212 corresponding to the change in state of the order item.

The method 400 may return to OPERATION 406, where a sequence number 308 may be generated for the order event 210 using consistent hashing. According to an aspect, the sequence number 308 may match the sequence number(s) 308 of other order events 210 associated with the particular order 300, which allows for all order events 210 associated with an order 300 to be grouped by a same weighted directed graph 200. For example, utilizing a weighted directed graph 200 can help to track missing order events 210 in an order process, and sequence numbers 308 generated using consistent hashing to group events of an order 300 ensures that order events 210 can be distributed to a same general computing device/cluster for enabling efficient complex data lookups.

Figure 5:
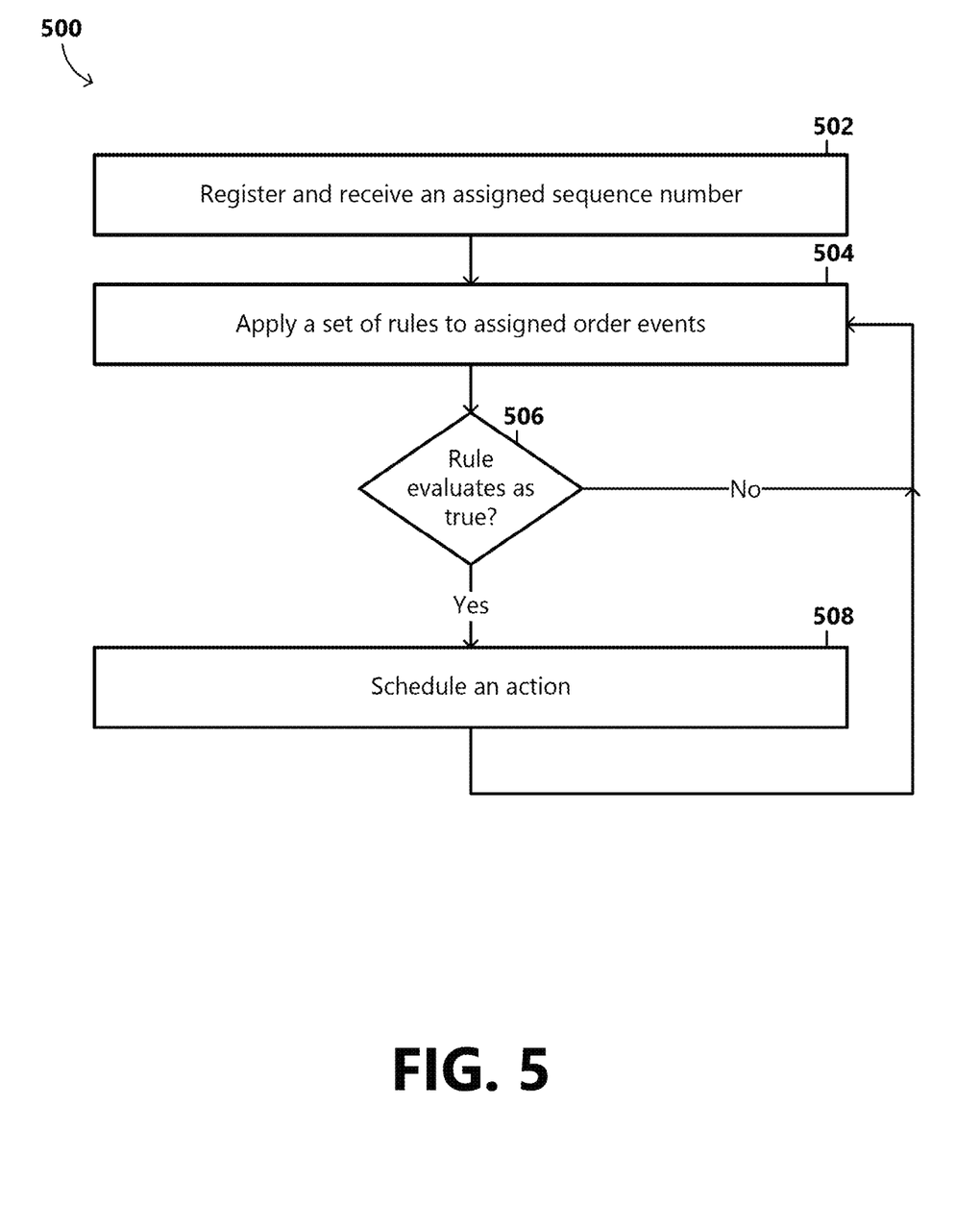
FIG. 5 is a flow chart depicting general stages of an example method for providing scalable order event monitoring and handling.

FIG. 5 is a flow diagram depicting general stages of an example method 500 for providing scalable order event monitoring and handling according to an embodiment. At OPERATION 502, a scheduler instance 126 may be assigned a sequence number 308 or a range of sequence numbers 308. For example, the scheduler instance 126 may use service discovery to register itself and receive an assigned sequence number 308 corresponding to a sequence number 308 generated for order events 210 using consistent hashing. As described above, order events 210 that are associated with a same order 300 may have sequence numbers 308 that match, which allows for all order events 210 associated with an order 300 to be grouped by a same weighted directed graph 200 and to be assigned to a same scheduler instance 126 to be processed. According to an aspect, the scheduler instance 126 may be allowed to only process order events 210 that match its assigned sequence number(s) 308.

At OPERATION 504, a set of rules may be applied to the order events 210 that match its assigned sequence number(s) 308. For example, the scheduler instance 126 may be configured to access, from an event storage instance 124, order events 210 matching its assigned sequence number 308. The scheduler instance 126 may be further configured to access the set of rules, which may include various conditions that describe conditions of the order process that is being tracked by the monitoring services 122. For example, a rule may be evaluated to determine whether a particular action/order process (e.g., notify a customer of a delay, notify a customer about order pickup) can be performed based on current states of line items of an order 300.

At DECISION OPERATION 506, a determination may be made as to whether a rule or set of rules evaluates as true. When a rule or a set of rules is determined to be true, at OPERATION 508, an action(s) associated with the rule or set of rules may be scheduled. For example, the scheduler instance 126 may be configured to publish a message to the command orchestrator 102 in association with the action, and the command orchestrator 102 may then broadcast the message to one or more services of the plurality of services included in the order management platform 100 that subscribe to receive messages about the action. For example, the one or more services of the plurality of services included in the order management platform 100 that subscribe to receive messages about the action may then perform the action or a related another action.

Figure 6:
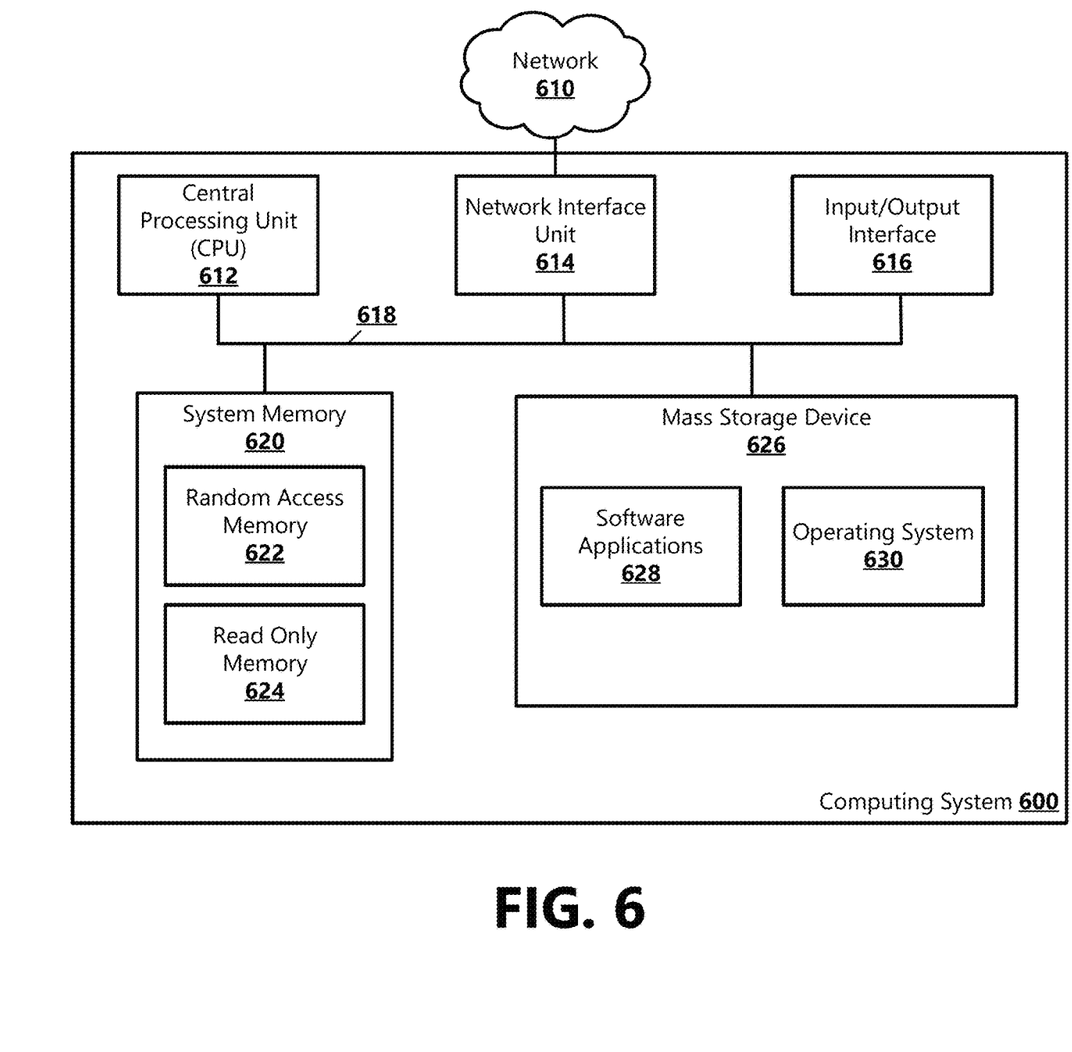
FIG. 6 is a block diagram of an example computing system.

Referring now to FIG. 6, an example block diagram of a computing system 600 is shown that is useable to implement aspects of the monitoring services 122 of FIGS. 1 and 3. In the embodiment shown, the computing system 600 includes at least one central processing unit ("CPU") 612, a system memory 620, and a system bus 618 that couples the system memory 620 to the CPU 612. The system memory 620 includes a random access memory ("RAM") 622 and a read-only memory ("ROM") 624. A basic input/output system that contains the basic routines that help to transfer information between elements within the computing system 600, such as during startup, is stored in the ROM 624. The computing system 600 further includes a mass storage device 626. The mass storage device 626 is able to store software instructions and data.

The mass storage device 626 is connected to the CPU 612 through a mass storage controller (not shown) connected to the system bus 618. The mass storage device 626 and its associated computer-readable storage media provide non-volatile, non-transitory data storage for the computing system 600. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 612 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 600.

According to various embodiments of the invention, the computing system 600 may operate in a networked environment using logical connections to remote network devices through a network 610, such as a wireless network, the Internet, or another type of network. The computing system 600 may connect to the network 610 through a network interface unit 614 connected to the system bus 618. It should be appreciated that the network interface unit 614 may also be utilized to connect to other types of networks and remote computing systems. The computing system 600 also includes an input/output controller 616 for receiving and processing input from a number of other devices, including a touch user interface display screen, or another type of input device. Similarly, the input/output controller 616 may provide output to a touch user interface display screen or other type of output device.

As mentioned briefly above, the mass storage device 626 and the RAM 622 of the computing system 600 can store software instructions and data. The software instructions include an operating system 630 suitable for controlling the operation of the computing system 600. The mass storage device 626 and/or the RAM 622 also store software instructions 628, that when executed by the CPU 612, cause the computing system 600 to provide the functionality discussed in this document. For example, the mass storage device 626 and/or the RAM 622 can store software instructions that, when executed by the CPU 612, cause the computing system 600 to provide scalable order event monitoring and handling.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A system for providing scalable order event monitoring and handling, comprising:
   a data store comprising a plurality of distributed event storage instances;
   a plurality of scheduler instances;
   at least one processor; and
   a memory coupled to the at least one processor, the memory including instructions that when executed by the at least one processor cause the system to:
      receive a message regarding a change of state of an order;

generate a first order event corresponding to the change of state;
use consistent hashing to generate a sequence number;
assign the sequence number to the first order event;
store the first order event in an event storage instance selected from among the plurality of distributed event storage instances based on the sequence number, wherein different sequence numbers are assigned to different ones of the plurality of distributed event storage instances;
assign the first order event to a scheduler instance of the plurality of scheduler instances based on the sequence number;
retrieve the first order event from the event storage instance based on the assigned sequence number;
generate a weighted directed graph associated with the sequence number, the weighted directed graph including the first order event as a representation of an order process, the weighted directed graph including a plurality of nodes, each node corresponding to an order state;
evaluate the weighted directed graph against one or more rules to determine eligibility of an action; and
schedule the action based on the evaluation.

2. The system of claim 1, wherein the system is further configured to:
receive state change information related to the order;
record the state change information by generating a second order event corresponding to the change of state;
use consistent hashing to assign the sequence number to the second order event; and
store the second order event in the event storage instance;
retrieve the first order event and the second order event from the event storage instance based on the assigned sequence number;
generate a weighted directed graph including the first order event and the second order event as a representation of the order process;
evaluate the weighted directed graph against one or more rules to determine eligibility of an action; and
schedule the action based on the evaluation.

3. The system of claim 1, wherein the first order event includes:
state information corresponding to the change of state of the order; and
item quantity information.

4. The system of claim 3, wherein the weighted directed graph includes:
a first node included among the plurality of nodes, the first node representing the state information; and
a first edge directed to the first node representing the item quantity information.

5. The system of claim 4, wherein the state information represented by the first node comprises an indication of at least one of:
a created state;
a pre-scheduled state;
a scheduled state;
a backordered state;
a released state; and
a shipped and invoiced state.

6. The system of claim 1, wherein the scheduler instance is configured to process order events to which the sequence number is assigned.

7. The system of claim 2, wherein the plurality of scheduler instances are configured to process order events in parallel.

8. The system of claim 1, wherein:
the order is comprised of one or more line items; and
each line item is represented by an individual weighted directed graph.

9. A method for providing scalable order event monitoring and handling, comprising:
receiving one or more messages regarding one or more changes of state of an order;
generating one or more order events corresponding to the one or more changes of state;
generating a sequence number using consistent hashing;
assigning the sequence number to the one or more order events;
storing the one or more order events in an event storage instance selected from among a plurality of distributed event storage instances based on the sequence number, wherein different sequence numbers are assigned to different ones of the plurality of distributed event storage instances;
assigning the one or more order events to a scheduler instance of a plurality of distributed scheduler instances based on the sequence number;
retrieving the one or more order events from the event storage instance based on the assigned sequence number;
generating a weighted directed graph associated with the sequence number, the weighted directed graph including the one or more order events as a representation of an order process, the weighted directed graph including a plurality of nodes, each node corresponding to an order state;
evaluating the weighted directed graph against one or more rules to determine eligibility of an action; and
scheduling the action based on the evaluation.

10. The method of claim 9, wherein generating one or more order events comprises:
generating at least one node comprising state information corresponding to the one or more changes of state of the order; and
generating at least one edge comprising a weight, wherein:
the weight corresponds to quantity information; and
the edge is directed to the at least one node.

11. The method of claim 10, wherein generating the at least one node comprises generating a node including an indication of at least one of:
a created state;
a pre-scheduled state;
a scheduled state;
a backordered state;
a released state; and
a shipped and invoiced state.

12. The method of claim 10, wherein generating the weighted directed graph comprises generating a weighted directed graph for each line item included in the order.

13. The method of claim 12, wherein generating the weighted directed graph for each line item included in the order comprises, for each order event in each line item:
generating a node including order line item state information; and
generating an edge comprising a weight, wherein:
the edge is directed to the node; and
the weight corresponds to order line item quantity information.

14. The method of claim 9, wherein prior to receiving the one or more messages, subscribing to receive messages from a command orchestrator configured to publish messages received from a plurality of order processing services.

15. The method of claim 14, wherein scheduling the action comprises publishing a message to the command orchestrator for publishing to one or more services that subscribe to receive messages related to the action.

16. The method of claim 9, wherein evaluating the weighted directed graph comprises processing order events in parallel with other scheduler instances of the plurality of scheduler instances.

17. A computer readable storage device comprising non-transitory computer-readable storage media that stores executable instructions which, when executed by a processor, cause the processor to perform scalable order event monitoring and handling, the instructions comprising:
   receiving one or more messages regarding one or more changes of state of an order;
   generating one or more order events corresponding to the one or more changes of state;
   generating a sequence number using consistent hashing;
   storing the one or more order events in an event storage instance of a plurality of distributed event storage instances based on the sequence number, wherein different sequence numbers are assigned to different ones of the plurality of distributed event storage instances;
   assigning the one or more order events to a scheduler instance of a plurality of distributed scheduler instances based on the sequence number;
   retrieving the one or more order events from the event storage instance based on the assigned sequence number;
   generating, for each line item included in the order, a weighted directed graph associated with the sequence number, the weighted directed graph including the one or more order events as a representation of an order process, the weighted directed graph including a plurality of nodes, each node corresponding to an order state;
   evaluating the weighted directed graph against one or more rules to determine eligibility of an action; and
   scheduling the action based on the evaluation.

18. The computer readable storage device of claim 17, wherein generating one or more order events comprises:
   generating at least one node comprising state information corresponding to the one or more changes of state of the order; and
   generating at least one edge comprising a weight, wherein:
      the weight corresponds to quantity information; and
      the edge is directed to the at least one node.

19. The computer readable storage device of claim 18, wherein generating the at least one node comprises generating a node including an indication of at least one of:
   a created state;
   a pre-scheduled state;
   a scheduled state;
   a backordered state;
   a released state; and
   a shipped and invoiced state.

20. The computer readable storage device of claim 18, wherein generating the weighted directed graph for each line item included in the order comprises:
   for each order event in each line item, generating a node including order line item state information; and
   for each order event in each line item, generating an edge comprising a weight, wherein:
      the edge is directed to the node; and
      the weight corresponds to order line item quantity information.

\* \* \* \* \*